United States Patent Office 3,619,962
Patented Nov. 16, 1971

3,619,962
METAL CLEANER
Gordon C. Combe, 16 Lyndhurst Place,
London, Ontario, Canada
No Drawing. Continuation-in-part of application Ser. No. 582,538, Sept. 28, 1966. This application Sept. 25, 1969, Ser. No. 861,173
Int. Cl. C11c 3/00; B24d 3/02
U.S. Cl. 51—304                                                 7 Claims

ABSTRACT OF THE DISCLOSURE

A liquid abrasive cleaner which is essentially non-acidic, is not harmful to the human skin, which is particularly useful for cleaning metallic surfaces, in particular stainless steel surfaces, and which leaves a non-corrosive protective coating thereon, which cleaner is in the form of a relatively stable homogeneous aqueous dispersion consisting essentially of, per 500 parts by weight of water and based upon the total weight of the composition, (a) from about 10–30 parts by weight of soap fatty acid (b) from about 10–30 parts by weight of dicarboxylic acid (c) a weak base in an amount at least sufficient to neutralize said acids and form salts therewith (d) from about 90–50 parts by weight of calcined diatomaceous silica of predominately colloidal particle size (e) from about 90–50 parts by weight of uncalcined diatomaceous silica of predominately colloidal particle size and (f) from about 20–40 parts by weight of a gelling agent, said gelling agent being present in an amount sufficient to maintain the calcined and uncalcined diatomaceous silica particles in homogeneous dispersion.

This application is a continuation-in-part of U.S. application No. 582,538 filed Sept. 28, 1966 and now abandoned.

The present invention relates to a liquid abrasive composition which is particularly useful in the cleaning of the surfaces of metal substrates and in particular the present invention relates to such a composition which is in the form of a homogeneous dispersion and which remains stable during normal periods of use.

Heretofore for the cleaning of metallic substrates, particularly copper substrates, liquid cleaners have been used which are acidic in nature relying on the reaction between the acid and the metal to remove a surface layer from the metal and therewith the tarnish on the removed surface of the metal. However such cleaners have limited applicability as in many applications it is not desirable to remove the surface layer of the metal. Further the cleaners being acidic in nature are harmful to the human skin and the cleaned metallic surfaces quickly retarnishes due to exposure of the bare cleaned metal surface with the atmosphere.

The present invention provides an essentially non-acidic liquid abrasive cleaning composition which is not harmful to the human skin and which readily and quickly cleans the tarnish from the surfaces of the metallic substrates without removing substantial amounts of the surface metal and which leaves a non-corrosive protective coating upon the cleaning surface of the metallic substrate to protect it from retarnishing on exposure to the atmosphere for significant periods of time. Further while the cleaning composition of the present invention is an abrasive composition it is found that it does not leave visible scratches upon the metallic surface and even with very soft metal, such as silver, any scratches which may be left by the composition of the present invention are microscopic in size.

According to the present invention therefore there is provided a liquid abrasive cleaning composition which is particularly suitable for the cleaning of the surface of metallic substrates, in particular stainless steel substrates, which composition is in the form of a homogeneous aqueous dispersion consisting essentially of, per 500 parts by weight of water and based upon the total weight of the composition, (a) from about 10–30 parts by weight of a soap fatty acid (b) from about 10–30 parts by weight of an aliphatic dicarboxylic acid (c) a weak base in an amount at least sufficient to neutralize said acids and form salts therewith (d) from about 90–50 parts by weight of calcined diatomaceous silica of predominately colloidal particle size (e) from about 90–50 parts by weight of uncalcined diatomaceous silica of predominately colloidal particle size and (f) from about 20–40 parts by weight of a gelling agent which gelling agent is present in an amount sufficient to maintain said calcined and uncalcined diatomaceous silica particles in homogeneous dispersion.

It is found with such a cleaning composition all that is required for cleaning is to apply for example by spraying the cleaning agent to the tarnish metallic surface, such as a stainless steel, briskly rub the surface with a soft cloth, then wipe off the excess composition with either a wet or dry, preferably wet cloth, and polish the clean surface with a soft clean cloth. The surface so obtained is clean, unscratched and has a bright appearance and the surface is protected from exposure to the atmosphere by a surface film.

The effectiveness of the liquid cleaning composition of the present invention is believed to depend to a great extent on the unique combination in the composition of the calcined diatomaceous silica and the uncalcined diatomaceous silica. The calcined diatomaceous silica, in particular that known as Super Floss which has an average particle size of from 2–4 microns is readily frangible and is believed to act as a soft abrasive. This soft abrasive is believed to provide for the ready removal of the tarnish on the surface of the metallic substrate which is not engrained therein. The uncalcined diatomaceous silica, in particular Snow Floss which has a particle size in the range of 1–2 microns, is also a relatively soft abrasive but is significantly harder than Super Floss, and is believed to provide for the ready removal of the more engrained tenacious surface tarnish, such as surface rust in stainless steel. Both diatomaceous silicas are essential ingredients in the cleaning composition and are believed to substantially aid each other in the respective removal of the surface tarnish and the more engrained tarnish in the surface of the metallic substrate. In particular when the calcined diatomaceous silica is present in the composition in an amount below about 50 parts by weight the effectiveness of both the uncalcined and calcined diatomaceous silica as abrasives is substantially reduced and it is found necessary in order to remove the surface tarnish to rub the metallic surface to which the cleaning composition has been applied substantially harder and for a substantially longer period of time and even with such rubbing the cleaning effect on the surface of the metallic substrate is substantially reduced. The consistency of the liquid cleaning composition is also substantially reduced with less than 50 parts by weight of calcined diatomaceous silica present which is undesirable. When more than 90 parts by weight of the calcined diatomaceous silica are present in the composition it is difficult in the preparation of the composition to form a homogeneous dispersion of the silica which tends to form lumps. It is also found that with large amounts over 90 parts by weight of the calcined diatomaceous silica the effectiveness of the uncalcined diatomaceous silica in removing the engrained surface tarnish is substantially reduced. Similarly when the uncalcined diatomaceous silica is present in an amount of less than 50 parts by weight then the engrained surface tarnish is difficult to remove and the effectiveness of the calcined diatomaceous silica removing the non-engrained surface tarnish is also substantially reduced, with the result that in cleaning the tarnished metallic surface, hard rubbing is necessary to remove the tarnish and the removal of the tarnish is substantially less efficient. The cleaning composition with less than 50 parts by weight of uncalcined diatomaceous silica also has a low consistency which as aforesaid is undesirable. When the uncalcined diatomaceous silica is present in an amount more than 90 parts by weight of the total composition then the silica is hard to homogeneously disperse in the preparation of the composition tending to form lumps and the effect of the uncalcined diatomaceous silica is also substantially reduced. It is preferred in general that equal proportions of the uncalcined and calcined diatomaceous silicas be present in the cleaning composition.

The salt of the aliphatic dicarboxylic acid, particularly a lower aliphatic dicarboxylic acid, such as glutaric acid and preferably oxalic acid, with the weak base is believed to act as a lifting agent in combination with the diatomaceous silica abrasives. It is thus believed that the aliphatic dicarboxylic acid salt aids the silica abrasives in removing the tarnish by lifting the loosened tarnish from the surface of the metallic substrate probably by dissolution. When the aliphatic dicarboxylic acid is present in an amount of less than about 10 parts by weight of the total weight of the composition then it is found that the lifting effect is insufficient and relatively hard rubbing with the composition of the present invention is necessary to effect adequate cleaning and further when the aliphatic dicarboxylic acid is present in an amount in excess of about 30 parts by weight of the total composition it tends to detract from the polishing effect supplied by the salt of the soap fatty acid with the weak base i.e. retards film formation.

The soap fatty acid which is present in the form of its salt with the weak base is primarily present for its detergent properties and is believed to wash away the loose or loosened tarnish particles from the surface of the metallic substrate and at the same time it is believed to aid in the formation of a non-corrosive surface film which is left by the cleaning composition on the surface of the metallic substrate. This film tends to protect the surface of the metallic substrate from the atmosphere for substantial periods of time, for example for a period of the order of 1-2 months with silver surfaces. When the soap fatty acid presents in an amount below about 10 parts by weight of the total composition the effectiveness of the cleaning composition is found to be substantially reduced in that the formation of the protective film is retarded, the appearance of the cleaned metallic sur face is dulled and the tarnish is substantially harder to remove necessitating harder rubbing. When the soap fatty acid is present in an amount above about 30 parts by weight abrasive effect of the calcined and uncalcined silicas is substantially reduced, the cleaner tending to polish the surface of the metal giving a glaze effect and also tending to reduce the lefting effect of the salt of the aliphatic dicarboxylic acid. This tends to reduce the overall effectiveness of the cleaning composition.

The weak base, which is desirably ammonium hydroxide although other weak bases such as triethanolamine may be used, provides a nonacidic solution, the weak base being present in an amount at least sufficient to form salts with the acid. With the soap fatty acid it is essential to form the salts to obtain the necessary detergent properties. The ammonium hydroxide further acts as a detergent for cleaning the surface of the metal.

The gelling agent is a conventional gelling agent and is merely required to retain the colloidal uncalcined and calcined diatomaceous silica particles in homogeneous dispersion and conventional gelling agents which may be mentioned include bentonite, kaolin, ball and china clay, casein gelatin or cellulose derivatives. Particularly suitable is magnesium montmorillonite such as that supplied under the trade name Ben-A-Gel (see Handbook of Material Trade Names, by Zimmerman and Lavine, Supplement II, published 1957). The gelling agent must be present in an amount sufficient to effect the aforesaid homogeneous dispersion of the diatomaceous silicas and below about 20 parts by weight of the composition is insufficient to do this, whereas above 40 parts by weight of the composition tends to form a gel which is undesirable in the composition of the present invention which is intended to be a liquid cleaner such as it may be readily applied, for example, by spraying on to the surface of the metallic substrate.

The present invention also provides a method of cleaning the surface of metallic such as silver, copper, nickel, chromium, brass, bronze, aluminum and steel, particularly stainless steel substrates by applying thereto the aforesaid cleaning composition. The surface is then rubbed with a cloth, the excess cleaning agent then removed with a wet or dry cloth, preferably a wet cloth and the surface that can be polished with a soft dry cloth. While the composition of the present invention is particularly useful in cleaning metallic surfaces, it has been found however, that this composition may also be used to clean other surfaces such as plastic surfaces such as melamine surfaces. In particular it has been found that the composition is highly useful in removing coffee and tea stains from "Melomac" (a trademark) wear. Further it has been found that the cleaning composition is particularly useful in the removal of the yellowing from enamel on stoves and refrigerators.

In a particular embodiment of the present invention the cleaning composition comprises, per 500 parts by weight of water based on the total weight of the composition, from about 10-30 parts by weight of oleic acid, from about 10-30 parts by weight of oxalic acid, 25 to 35 parts by weight ammonium hydroxide, from about 90-50 parts by weight of Super Floss, from 90-50 parts by weight of Snow Floss and from 20-40 parts by weight of magnesium montmorillonite as gelling agent.

The present invention also provides a method forming the liquid abrasive cleaning composition of the present invention which comprises forming a first aqueous solution by adding the soap fatty acid to an aqueous ammonium hydroxide solution with agitation, forming a second solution by dissolving the aliphatic dicarboxylic acid in hot water with agitation and mixing the first and second solutions with agitation to form a smooth fluid mixture, adding the calcined and uncalcined diatomaceous silica to the mixture so formed with high speed agitation and adding to the dispersion so formed the gelling agent.

The present invention will be further illustrated by way of the following example.

EXAMPLE

Into 100 gals. of hot deionized (saft) water at 170° F. in a glass waxed tank were added 85 lbs. of ammonia of 26° Bé. to form an aqueous ammonium hydroxide solution at a pH of about 7-10. To this solution was slowly added 67½ lbs. of oleic acid, the mixture being stirred with a high speed stirrer until clear and free from lumps.

In each of four 5 gal. pails, 15 lbs. of oxalic acid were dissolved in 3½ gals. of hot deionized water and the aqueous solution added slowly with stirring by a high speed stirrer to the oleic acid solution in the glass waxed tank. To avoid the mixture becoming lumpy or cheesy during the addition of the oxalic acid, its addition rate is very slow and ammonia is added as necessary to dissolve any lumps formed. The mixture so obtained is a smooth milky white fluid which is allowed to stand for a few minutes to allow entrapped air to escape from the mixture.

To this mixture is slowly added 210 lbs. of Super Floss and 225 lbs. of Snow Floss, the addition being slow and the mixture being stirred at high speeds, the speed of the stirrer forming a vortex at the center of the mixture. The Super Floss and the Snow Floss are poured down the vortex which forces the ingredients to the bottom of the mixture and the whirling blades of the stirrer shear the ingredients into the mix, thereby dispersing them homogeneously throughout the mix. The resulting mix is readily pourable and water is added if necessary to make up the water loss due to evaporation and adjust the consistency of the mix. The water addition may amount to 5 gals.

To this mixture is then added with the high speed stirring 30 lbs. of magnesium montmorillonite supplied under the trademark Ben-A-Gel, the addition of the Ben-A-Gel being slow over at least two hours. The trapped air is then allowed to escape and subsequently 13 lbs. of titanium dioxide supplied under the trademark Titanox A-WD is added with high speed stirring to improve the colour of the cleaning composition.

The homogeneous aqueous dispersion so obtained is a preferred metal cleaning agent according to the present invention and has the following composition.

TABLE 1

| Ingredients: | Percent by weight |
| --- | --- |
| Water | 62.1 |
| Ammonia 26° Bé. | 4.7 |
| Oleic acid | 3.7 |
| Oxalic acid | 3.3 |
| Super Floss | 11.5 |
| Snow Floss | 12.4 |
| Titanox A-WD | 0.7 |
| Ben-A-Gel | 1.6 |
| Total | 100.0 |

The embodiments of the invention in which an exclusive property or privilege is claimed are defined as follows:

1. A liquid abrasive cleaning composition particularly suitable for the cleaning of the surface of a metallic substrate in the form of a homogeneous aqueous dispersion consisting essentially of, per 500 parts by weight of water and based upon the total weight of the composition (a) from about 10-30 parts by weight of soap fatty acid (b) from about 10-30 parts by weight of a lower aliphatic dicarboxylic acid (c) a weak base in an amount at least sufficient to neutralize said acids and form salts therewith (d) from about 90-50 parts by weight of calcined diatomaceous silica of predominately colloidal particle size (e) from about 90-50 parts by weight of uncalcined diatomaceous silica of predominately colloidal particle size, and (f) from about 20-40 parts by weight of a gelling agent in an amount sufficient to maintain said diatomaceous silica particles in homogeneous dispersion.

2. A composition as claimed in claim 1 in which the weak base is ammonium hydroxide, the soap fatty acid is oleic acid salt and the oxalic acid salt are present in gelling agent is magnesium montmorillonite.

3. A composition as claimed in claim 2 in which the oleic acid, the dicarboxylic acid is oxalic acid, and the substantially equal proportions.

4. A composition as claimed in claim 2 consisting essentially of about 62.1% of water, 4.7% ammonia of 26° Bé., 3.7% of oleic acid, 3.3% of oxalic acid, 11.5% of calcined diatomaceous earth, 12.4% of uncalcined diatomaceous earth, 0.7% of titanium dioxide and 1.6% of magnesium montmorillonite.

5. A method of cleaning a metallic surface which comprises applying thereto a composition as claimed in claim 1, rubbing said metal surface with said composition and subsequently removing said composition from said metallic surface.

6. A method as claimed in claim 5 in which the surface is stainless steel.

7. A method of preparing the composition as claimed in claim 1 which comprises forming a first solution by adding the fatty soap acid to an aqueous ammonium hydroxide solution with agitation, forming a second solution by dissolving the lower aliphatic dicarboxylic acid in hot water with agitation and mixing the first and second solutions under agitation to form a smooth fluid mixture, adding the calcined and uncalcined diatomaceous silica to said mixture under high speed agitation and adding to the dispersion so obtained the gelling agent under agitation.

References Cited

UNITED STATES PATENTS

| 2,765,223 | 10/1956 | Candee et al. | 51—304 |
| 3,313,635 | 4/1967 | Wollek | 106—14 |
| 3,320,082 | 5/1967 | McMahon et al. | 106—14 |

DONALD J. ARNOLD, Primary Examiner

U.S. Cl. X.R.

51—281, 307, 308; 106—8, 14